United States Patent
Gleitz et al.

(10) Patent No.: US 6,587,825 B1
(45) Date of Patent: Jul. 1, 2003

(54) AUDIO TRANSMISSION METHOD FOR CHANNEL DOUBLING SYSTEM

(75) Inventors: Dale Gleitz, Fort Worth, TX (US); Thomas Forde Martin, Richardson, TX (US); Harvey Rogers, Irving, TX (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/551,337

(22) Filed: Apr. 18, 2000

Related U.S. Application Data

(60) Provisional application No. 60/130,923, filed on Apr. 23, 1999.

(51) Int. Cl.[7] .............................................. G10L 19/00
(52) U.S. Cl. ...................................................... 704/500
(58) Field of Search ........................................ 704/500

(56) References Cited

U.S. PATENT DOCUMENTS

| | | | | |
|---|---|---|---|---|
| 5,193,208 A | * | 3/1993 | Yokota et al. | 340/825.24 |
| 5,867,223 A | * | 2/1999 | Schindler et al. | 348/552 |
| 6,311,161 B1 | * | 10/2001 | Anderson et al. | 704/212 |

OTHER PUBLICATIONS

Characteristics Of Systems For Monochrome And Colour Television, Report 624–2, International Telecommunication Union (1970).

Harrington et al., Audio Subcarriers (SbC/FM), pp. 25–26 and 37–47, The Hidden Signals On Satellite TV, Second Edition No Date.

Long, 1985 World Satellite Almanac, vol. 1, pp. 66–67 No Date.

Jack, Video Demystified, Second Edition, pp. 96–98 (1996).

* cited by examiner

*Primary Examiner*—Tālivaldis Ivars Šmits
*Assistant Examiner*—A. Armstrong
(74) *Attorney, Agent, or Firm*—Volpe and Koenig, P.C.

(57) ABSTRACT

A system transmits two audio services, each related to a different video program, within the bandwidth typically reserved for a single audio channel. Each audio service may be processed as a mono, stereo or encrypted signal prior to modulation onto its own audio carrier. The two audio carriers are summed together and applied to an RF modulator. The frequencies of the audio carriers are selected to ensure that the quality of the video program is not degraded, the video channel mask bandwidth is not exceeded and interference from the unselected audio carrier is negligible.

14 Claims, 4 Drawing Sheets

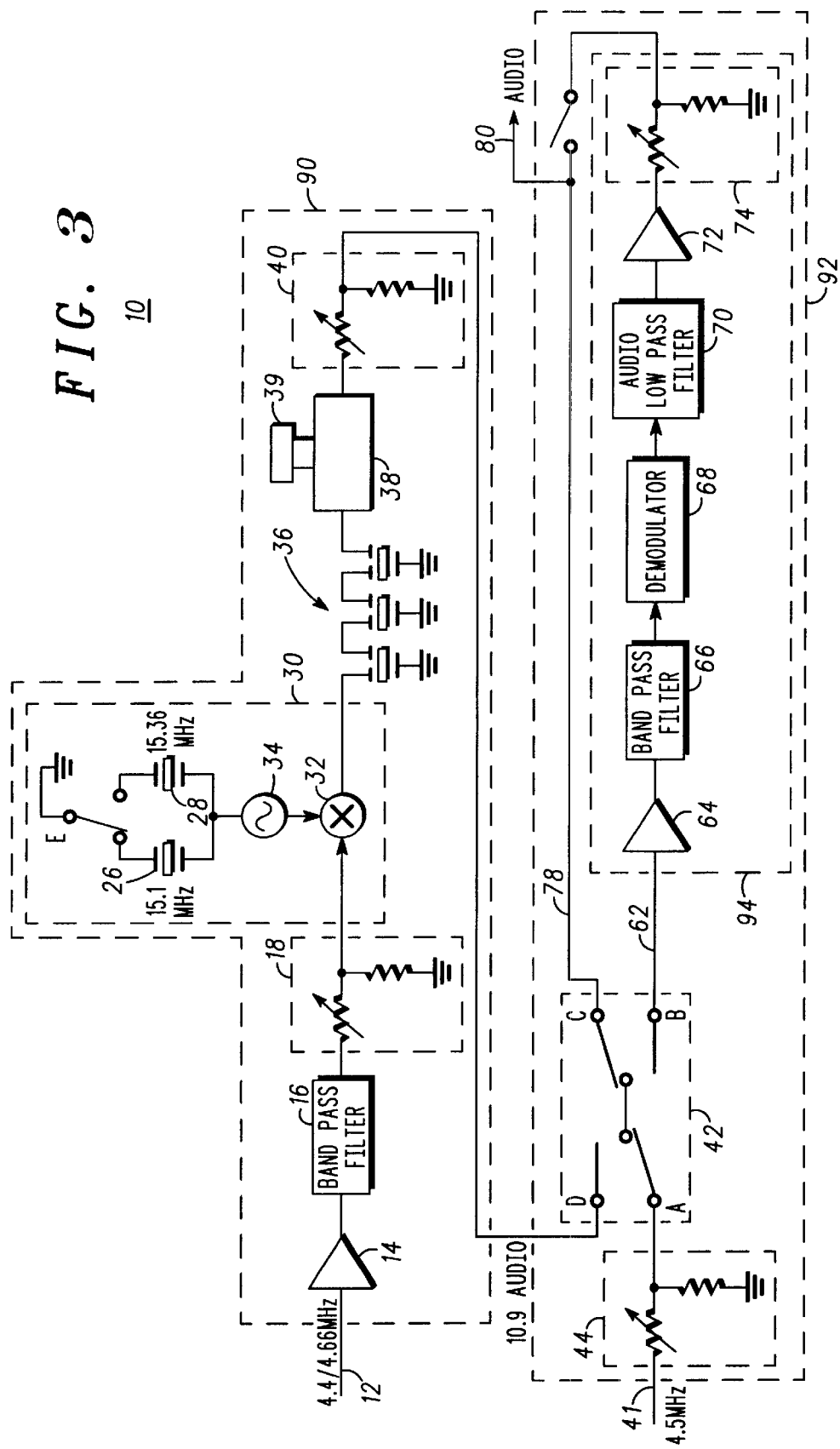

AUDIO TRANSMISSION METHOD FOR CHANNEL DOUBLING SYSTEM

This application claims the benefit of Provisional application Ser. No. 60/130,923, filed Apr. 23, 1999.

BACKGROUND

This invention relates to cable television (CATV) and wireless (MMDS or VHF/UHF) transmission systems. More particularly, the invention relates to a system and method for doubling the number of audio channels to be transmitted over the RF bandwidth typically reserved for a single audio transmission.

With the increasing array of services from CATV and wireless network operators, it has become imperative for operators to offer more services in the same amount of RF transmission bandwidth. Moreover, wireless pay television systems, whether MMDS or conventional VHF/UHF television, are generally constrained to far fewer channels than the conventional CATV systems with which they compete. The challenge is offering more channels to subscribers within the spectrum constraints imposed by government regulations.

For a typical television program, since the video portion of the program occupies most of the available 6 MHz on an NTSC television channel, much of the research toward maximizing the amount of bandwidth has been traditionally devoted towards compressing and minimizing the amount of bandwidth the video information occupies. However, it is equally important to minimize the amount of bandwidth which is dedicated to the audio portion of the program, or maximize the amount of audio channels which can be transmitted within the bandwidth typically reserved for a single audio channel. Accordingly, the present invention is directed towards maximizing the amount of information transmitted within the audio portion of the RF bandwidth.

There are several audio transmission systems which have attempted to increase the number of audio channels transmitted within the bandwidth typically reserved for a single audio channel. For example, the German Zweiton audio transmission method utilizes two RF audio carriers to provide either a selection between two language audio options, or a single stereo audio derived from the two carriers. Using this system, the audio is restricted to a single transmitted video program.

Another method for transmitting audio is the "FM-Squared" method for transmitting audio in analog satellite transmissions. The FM-Squared method uses one or more FM audio carriers added to the frequency spectrum above the baseband video signal to create a composite video signal. However, the FM-Squared method is similarly limited to the German Zweiton audio transmission method since alternative audio transmission formats are not permitted on the two FM audio carriers.

Accordingly, there exists a need for providing more channel capacity within the same amount of transmission bandwidth while maintaining the quality of the transmitted audio and providing flexibility regarding the audio format.

SUMMARY

The present invention provides for the transmission of two audio services, each related to a different video program, within the bandwidth typically reserved for a single audio channel. Each audio service may be processed as a mono, stereo (BTSC method) or encrypted signal prior to modulation onto its own audio carrier. The two audio carriers are summed together and applied to an RF modulator. The frequencies of the audio carriers are selected to ensure that the quality of the video program is not degraded, the video channel mask bandwidth is not exceeded and interference from the unselected audio carrier is negligible. An alternative method of transmitting two audio services on single audio carrier is also presented whereby the second audio service is modulated onto a subcarrier of the main audio carrier of the first audio service.

Accordingly, it is an object of the present invention to transmit two audio services, each related to a different video program, within the RF bandwidth typically reserved for a single audio service without exceeding the video channel mask bandwidth or degrading the quality of the video program.

Other objects and advantages of the present invention will become apparent after reading the detailed description of presently preferred embodiment.

DESCRIPTION OF THE DRAWINGS

FIG. 3 is a detailed block diagram of the preferred embodiment of the audio doubling system.

DETAILED DESCRIPTION OF THE PREFERRED EMBODIMENTS

Figure 1:
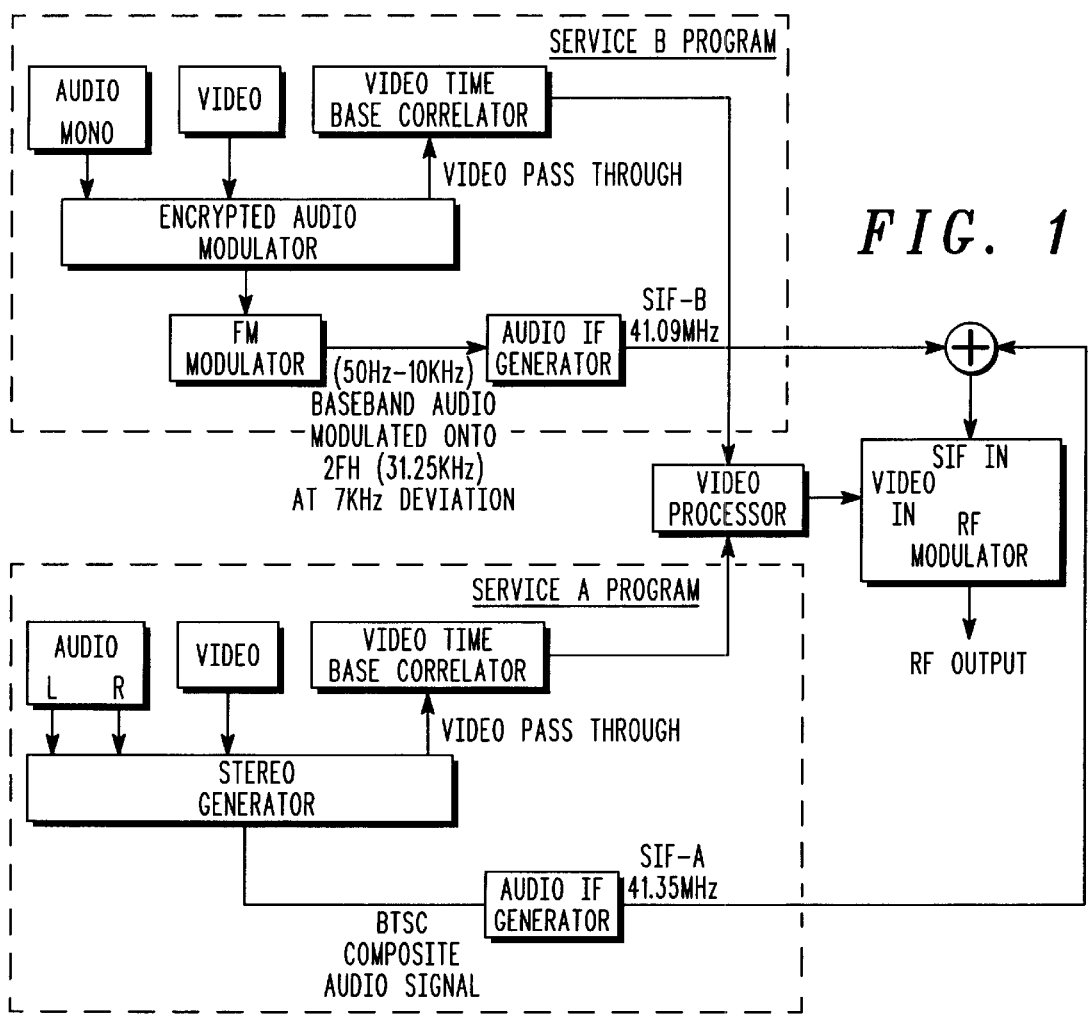
FIG. 1 is a block diagram of a head end made in accordance with the dual audio carrier method of the present invention.

The preferred embodiment will be described with reference to the drawing figures wherein like numerals represent like elements throughout.

Referring to FIG. 1, a headend made in accordance with the dual audio carrier method of the present invention is shown. The dual audio carrier method is intended to be utilized with a corresponding method for doubling the capacity of a video channel to enable two separate video services to be transmitted within the band width for a single video service. However, the video doubling method will not be described herein.

Using the dual audio carrier method of the present invention, two closely spaced audio carriers are used to transmit the audio services, shown in FIG. 1 as Service A and Service B, related to two independent video programs. Each audio carrier may be transmitted in mono, stereo or encrypted modes. FIG. 1 demonstrates the use of stereo transmission on Service A and encryption on Service B as one possible combination. However, one of skill in the art should clearly recognize that any combination may be transmitted in accordance with the teachings of the present invention.

Service A audio and video are presented to a stereo generator. The stereo generator outputs a BTSC composite signal, which is applied to an audio IF generator. The IF generator outputs a 41.35 MHz BSTC stereo signal. Service B audio and video are presented to an encryptor. The audio is applied to an FM modulator which modulates the audio onto a subcarrier frequency at twice the video horizontal frequency (2*fH, 31.25 kHz) at +/−7 kHz deviation. This signal is output to the audio IF generator which then modulates the subcarrier onto an audio IF carrier of 41.09 MHz at +/−50 kHz deviation. The two audio IF carriers are summed together and applied to the RF Modulator audio IF input where the 4.4 MHz and 4.66 MHz signals take the place of the "normal" intercarrier frequency of 4.5 MHz.

The video signal of each service is passed through the stereo generator or the encrypted audio modulator passthrough circuitry to provide a reference frequency for each generator before being applied to the video time base corrector, video processor and the RF modulator video input. The output of the RF modulator is a six (6) megahertz signal for transmission to the set top terminals via CATV transmission network.

Figure 2:
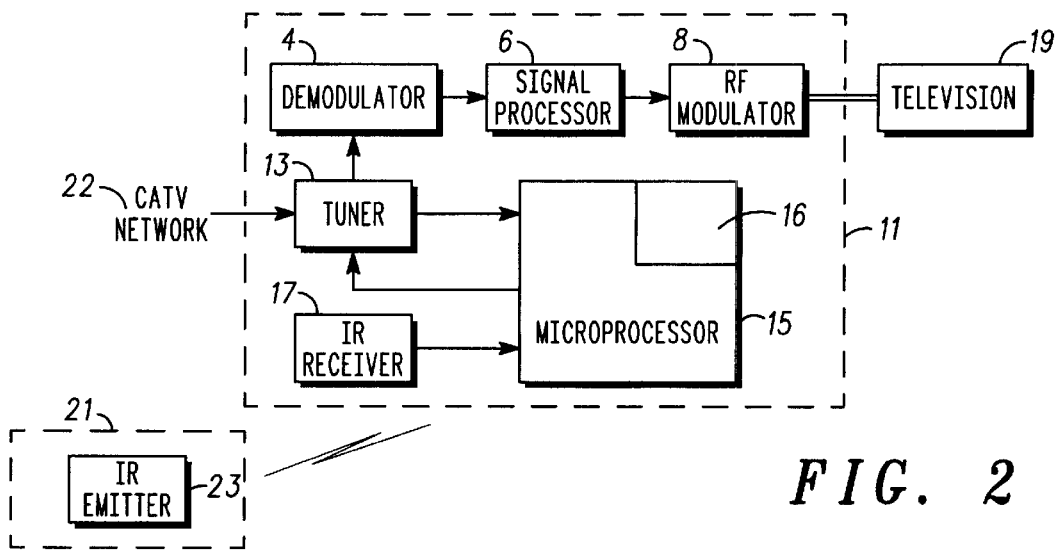
FIG. 2 is a block diagram of a set top terminal made in accordance with the present invention.

Referring to FIG. 2, a block diagram of a settop terminal 11 made in accordance with the present invention is shown. The settop terminal 11 includes a frequency agile tuner 13, a microprocessor 15, (including an associated memory 16), an IR receiver 17, a demodulator 4, a signal processor 6, and an RF modulator 8. The tuner 13 receives the video and associated audio programs from the headend. The microprocessor 15 controls all internal functions of the settop terminal 11 including the processing of video and audio content for output to a subscriber's television 19.

The settop terminal 11 receives channel change and volume control instructions from the subscriber via a remote control 21 or via front panel keyboard entry. The remote control 21 includes an infrared (IR) signal emitter 23 which sends IR control signals to the IR receiver 17.

The video and associated audio programs from the headend are transmitted across the CATV network or wireless transmission system 22 and are processed through the tuner 13 and the microprocessor 15. The tuner 13 is responsible for tuning to the frequency of the in-band channel selected by the subscriber. The tuner 13 output is a composite IF signal with a video carrier frequency of 45.75 MHz and its associated audio carrier(s). If a single audio carrier is present, (i.e. at 4.5 MHz), the audio demodulation to mono, stereo composite or encrypted subcarrier is performed by the demodulator 4. If dual audio carriers are present, the carriers are individually demodulated with the signal processor 6 as selected by the microprocessor 15. Encrypted audio, if present, is decoded within the signal processor 6. The resultant baseband audio or stereo composite signal is placed on an intercarrier frequency by the RF modulator 8, on Channel 3 or 4, for output to a television 19. If the channel selected by the subscriber comprises a "doubled channel", with two video programs and their associated audio programs, (i.e, Service A and Service B), the microprocessor 15 will control the appropriate portion of audio decoder activity to decode the audio associated with the selected video service.

As will be described in greater detail hereinafter, when the settop terminal 11 is tuned by the subscriber channel that carries the doubled video service, the service selected by the user represents either Service A or Service B. The appropriate audio carrier for the selected service is determined by the microprocessor 15.

The dual audio carrier method of the present invention supports six basic audio modes of operation as shown in Table 1. The first two modes of operation utilize the 4.5 MHz audio carrier input. This is the "standard audio" in CATV and wireless systems which implement the NTSC format. Mode 1 accepts the 4.5 MHz audio carrier input and outputs an unencrypted stereo or mono signal. Mode 2 accepts that 4.5 MHz input and outputs an decrypted mono signal.

TABLE 1

| AUDIO MODES | | SWITCH STATE | | | | |
|---|---|---|---|---|---|---|
| INPUT | OUTPUT | A | B | C | D | E |
| 1) 4.5 MHz unencrypted | stereo or mono | closed | open | closed | open | — |
| 2) 4.5 MHz unencrypted | decrypted mono | closed | closed | open | open | — |
| 3) 4.4 MHz unencrypted | Service A stereo or mono | open | open | closed | closed | first |
| 4) 4.4 MHz encrypted | Service A decrypted mono | open | closed | open | closed | first |
| 5) 4.66 MHz unencrypted | Service B stereo or mono | open | open | closed | closed | second |
| 6) 4.66 MHz encrypted | Service B decrypted mono | open | closed | open | closed | second |

Figure 2A:
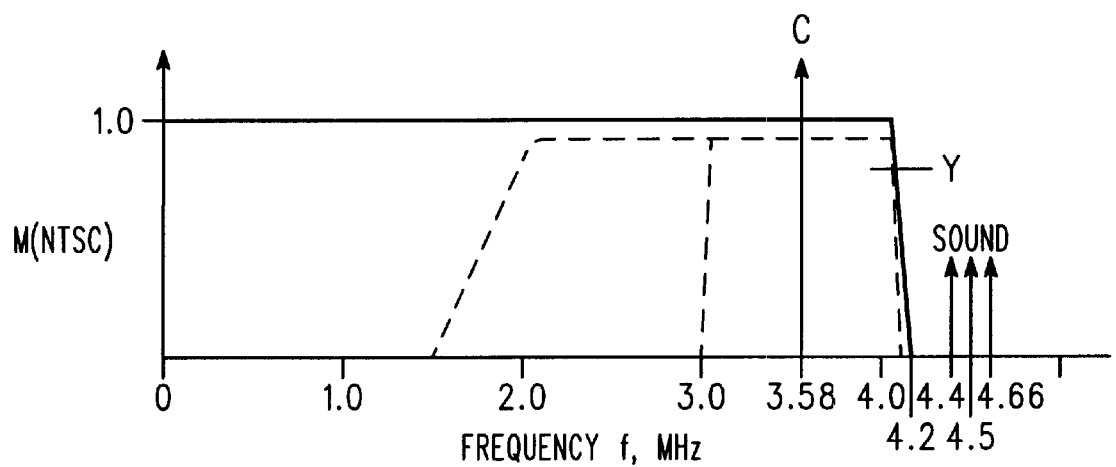
FIG. 2A is a graph of the location of the 3 audio carriers in relation to the video signal.

Modes 3–6 relate to the dual audio carrier mode of operation of the present invention, wherein either Service A or Service B is selected. Service A is the audio carrier input at 4.4 MHz. Service B is the audio carrier input at 4.66 MHz. Mode 3 accepts the 4.4 MHz audio carrier input and outputs an unencrypted stereo or mono signal for Service A. Mode 4 accepts the 4.4 MHz audio carrier input and outputs an decrypted mono audio signal for service A. Mode 5 accepts the 4.66 MHz audio carrier input and outputs an unencrypted stereo or mono signal for Service B. Mode 6 accepts a 4.66 MHz audio carrier input and outputs an decrypted mono audio signal for Service B. The three audio carriers are shown in FIG. 2A as positioned within the 6 MHz channel mask bandwidth. In accordance with the present invention, it is desired to keep the audio carriers within the 6 MHz channel mask bandwidth. These audio modes and the function of the associated input states of Table 1 will become more apparent with reference to FIG. 3.

The audio doubling system 10 of FIG. 3 comprises a "standard audio" section 92 and a dual audio section 90. Standard audio modes, (Modes 1 and 2 in Table 1), are processed solely in the standard audio section 92. The system 10 accepts a 4.5 MHz demodulated IF carrier signal 41 from the demodulator 4 and adjusts the signal power level with a variable gain controller 44. This signal is then fed into a master switch 42 which comprises four switches: 1) a standard audio switch A; 2) a privacy audio switch B; 3) a non-privacy audio switch C; and 4) a dual audio switch D. As shown in Table 1, for Mode 1 which accepts the 4.5 MHz audio carrier and outputs an unencrypted stereo or mono signal, the standard audio switch A and the non-privacy switch C are closed. This feeds the 4.5 MHz IF audio carrier input 41 to the audio output 80. Since the privacy switch B and the dual audio switch D are open, they will have no impact upon the audio output 80. In order to determine whether a signal is encrypted or unencrypted, and decide which mode to use, the microprocessor 15 selects the appropriate audio mode for a particular service as determined by an uploaded channel map.

For Mode 2, the standard audio switch A and the privacy audio switch B are closed. Accordingly, the 4.5 MHz audio carrier input 41 is fed through the standard audio switch A and the privacy switch B to the decryption circuitry 94. The decryption circuitry 94 decrypts the encrypted signal and outputs the signal through the privacy switch B to the audio output 80. The decryption circuitry 94 comprises a buffer 64, a bandpass filter 66, a demodulator 68, an audio low-pass filter 70, a second buffer 72, and a variable gain controller 74. The demodulator 68 uses six hex inverters and associated capacitors to demodulate the encrypted subcarrier. As shown, the present system 10 is backward compatible with present systems which permits the system 10 to be utilized with CATV and wireless networks which do not utilize the dual audio carrier audio transmission method of the present invention.

When the settop terminal 11 is used within a CATV and wireless network which uses the dual audio carrier channels in accordance with the present invention, the system 10 employs the dual audio section 90. Referring again to FIG. 3, the 4.4 MHz audio carrier 12 input for Service A or the 4.66 MHz audio carrier input for Service B is selected by the microprocessor 15 and is fed into the dual audio section 90. The input audio carrier 12 is passed through the buffer 14 and the bandpass filter 16 to a variable gain controller 18. The gain controller 18 ensures that the proper signal power level is input into the mixer 30.

The mixer 30 includes a mixing means 32, an oscillator 34, two crystals 26, 28, and a crystal switch E. The crystal switch E engages the first crystal 26 in its first state and the second crystal 28 in its second state. If Service A is selected, the 4.4 MHz audio carrier has been selected for demodulation. The crystal switch E engages the first crystal 26 and causes the oscillator 34 to output a 15.10 MHz signal. This signal is mixed with the 4.4 MHz audio carrier to output a 10.7 MHz I.F. signal. The signal is passed through a bandpass filter 36, a demodulator IC 38 with ceramic discriminator 39 and another variable gain controller 40 before entering the standard audio section 92.

Alternatively, if Service B is selected, which results in a 4.66 MHz audio carrier, the switch 24 switches to its second position to engage the second crystal 28 and cause the oscillator 34 to output a 15.36 MHz signal. This signal is mixed with the 4.66 MHz audio carrier to output a 10.7 MHz I.F. signal. Depending upon whether the output of the dual audio section 90 is to be encrypted or decrypted, switches B and C are activated accordingly to toggle the decryption circuitry 94 into or out of the audio path.

An alternative embodiment of the present invention utilizing a single audio carrier to support four basic audio modes of operation will now be explained. In this embodiment, the first audio program is pre-emphasized and FM modulated onto a 2fH subcarrier. The 2fH subcarrier is then frequency modulated onto the main subcarrier. The second audio program is pre-emphasized and frequency modulated at baseband onto the main subcarrier. The audio bandwidth for both programs is limited prior to modulation to reduce interference and to keep the audio performance similar between Service A and Service B. All of the modes for the second embodiment accept the standard 4.5 MHz audio carrier input.

Figure 4:
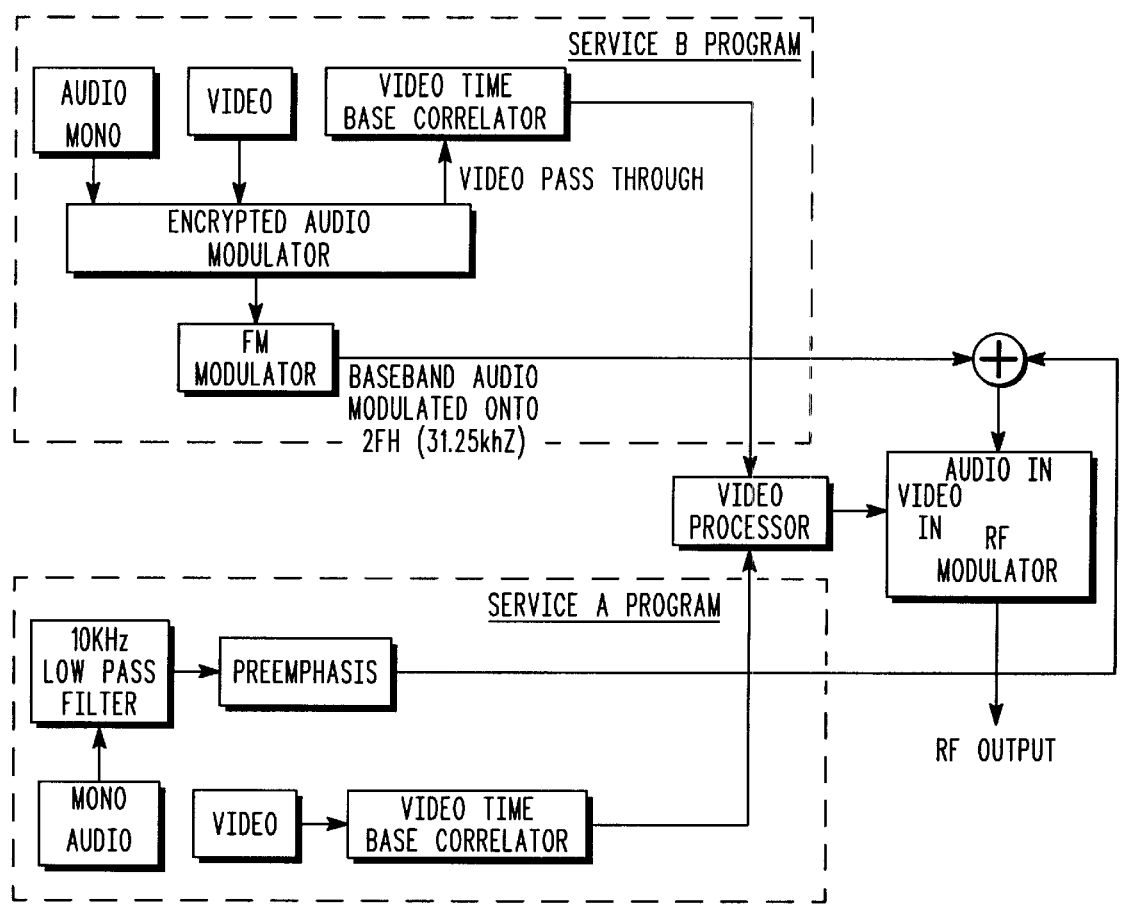
FIG. 4 is a block diagram of a head end made in accordance with the single audio carrier method of the present invention.

Referring to FIG. 4 one audio carrier at the "normal" intercarrier frequency of 4.5 MHz is used to transmit the audio programs related to two independent video programs. Service A is transmitted in mono while Service B is transmitted encrypted. Service A audio is presented to a low-pass filter and preemphasis. Service B audio is applied to an FM modulator which modulates the audio onto a subcarrier frequency at twice the video horizontal frequency (*fH, 31.25 kHz) at +/−7 kHz deviation. The filtered and preemphasized Service A audio and the subcarrier containing the Service B audio are summed together and applied to the RF modulator audio input. Service B video is passed through the encrypted audio modulator pass-through circuitry to provide a reference frequency for that generator before being applied to time-base correction, video processing and the RF modulator video input. Service A video is also applied to time-base correction, video procession and the RF modulator video input.

Referring to Table 2, the four basic audio modes of operation supported by the signal audio carrier method of the present invention are shown. Mode 1 outputs an unencrypted stereo or mono signal on the standard subcarrier. Mode 2 outputs a decrypted signal on the 2fH subcarrier. Mode 3 outputs Service A on the standard subcarrier and mode 4 outputs Service B on the 2fH subcarrier.

TABLE 2

| AUDIO MODES | | SWITCH STATE | | | |
|---|---|---|---|---|---|
| INPUT | OUTPUT | G | H | I | J |
| 1) 4.5 MHz unencrypted | unencrypted stereo or mono | open | closed | open | open |
| 2) 4.5 MHz encrypted | decrypted on 2fH subcarrier | closed | open | open | closed |
| 3) 4.5 MHz | Service A | open | open | closed | closed |
| 4) 4.5 MHz encrypted | Decrypted Service B on 2fH subcarrier | closed | open | open | closed |

Figure 5:
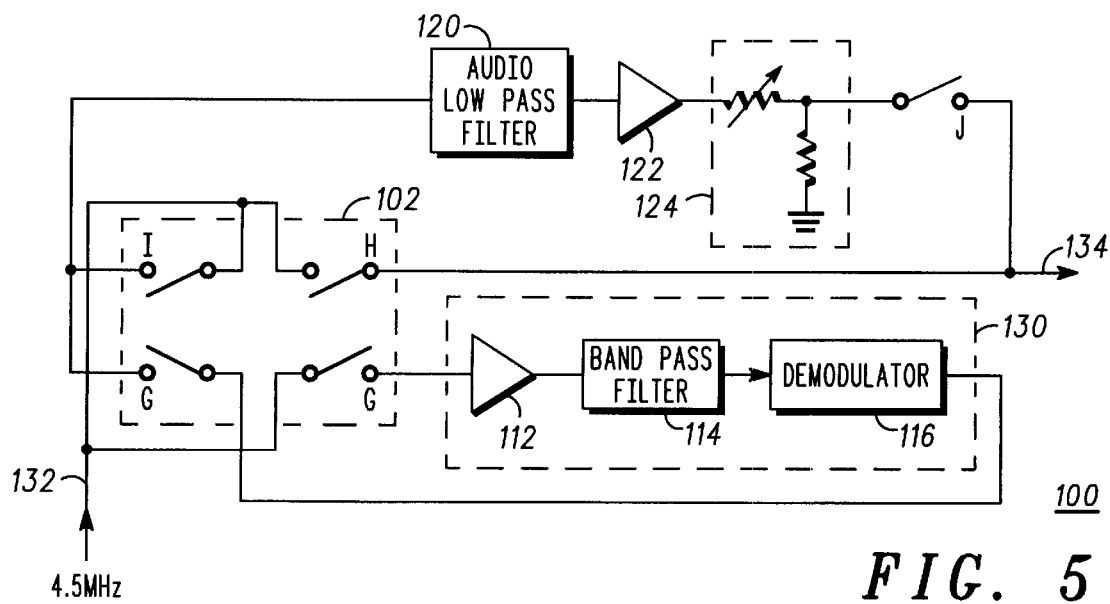
FIG. 5 is an alternate embodiment of the audio doubling system.

Referring to FIG. 5, the alternative embodiment of the present invention is shown. In this embodiment, when the settop terminal 11 is tuned by the subscriber to an in-band channel that supports a doubled video service, the appropriate audio mode for the selected service is determined by the microprocessor 15. The signal processing section 6 receives the demodulated audio output from the demodulator 4 which contains the main channel audio and the subcarrier audio. This composite audio signal is applied to an audio switch 102. The audio switch 102 comprises three switches: 1) a privacy switch G; 2) a non-privacy switch I; and 3) a standard audio switch H. The system 100 also includes a line switch J. For Mode 1, the 4.5 MHz audio carrier input 132 enters the switch 102 and passes through switch H, which is closed. Since the other switches G, I, J are open, the audio carrier input is fed to the audio output 134, which is applied to the volume control input within the demodulator 4. For Mode 2, which provides a decrypted audio output on the 2fH subcarrier, the privacy switch G and the line switch J are closed and the standard audio switch H and the non-privacy switch I are open. In this mode, the 4.5 MHz audio carrier input 132 is passed through the first portion of the privacy switch G to the demodulation circuitry 130 which includes a buffer 112, a bandpass filter 114 and a demodulator 116. The purpose of the demodulation circuitry 130 is to demodulate the signal from the 2fH subcarrier. The demodulated output is again passed through the second portion of the privacy switch G and to a low-pass filter 120, a buffer 122, and a variable gain controller 124. The signal is fed through the line switch J to the audio output 134.

Mode 3 outputs audio Service A from the 4.5 MHz audio carrier. In this mode, the non-privacy switch I and the line switch J are closed and the standard audio switch H and the privacy switch G are open. The 4.5 MHz audio carrier input passes through the non-privacy switch I. The audio is output through the low-pass filter 120, the buffer 122 and the variable gain controller 124. The output passes through the line switch J and to the audio output 134. Mode 4 provides unencrypted Service B from the 2fH subcarrier. For this mode, the privacy switch G and the line switch J are closed, and the standard audio switch H and the non-privacy switch I are open. The 4.5 MHz audio carrier input 132 is passed through the first portion of the privacy switch G to the demodulation circuitry 130, which demodulates the signal from the 2fH subcarrier. The demodulated output is again passed through the second portion of the privacy switch G and to a low-pass filter 120, a buffer 122, and a variable gain controller 124. The signal is fed through the IF line switch J to the audio output 134.

What is claimed:

1. A system for transmitting a plurality audio services over a broadband network within the bandwidth reserved for a single audio channel, the system comprising:
    a first intercarrier frequency generator connected to a first audio source for modulating the first audio source onto a first IF frequency;
    a second intercarrier frequency generator connected to a second audio source for modulating the second audio source onto a second IF frequency;
    a summing device coupled to each of the intercarrier frequency generators for summing the first and second modulated audio sources; and,
    a terminal remotely coupled to the summing device for detecting the presence of the first and second audio sources, demodulating each audio source, and coupling each audio source to an associated video channel being transmitted with the audio sources.

2. The system of claim 1 further comprising an encryption device connected between the first audio source and the first intercarrier frequency generator.

3. The system of claim 2 wherein the second IF frequency is approximately 4.66 MHz.

4. The system of claim 1 further comprising an encryption device connected between the second audio source and the second intercarrier frequency generator.

5. The system of claim 2 further comprising an FM Modulator connected between the encryption device the first intercarrier frequency generator.

6. The system of claim 4 further comprising an FM Modulator connected between the encryption device the second intercarrier frequency generator.

7. The system of claim 1 further comprising a stereo generator connected between the second audio source and the second intercarrier frequency generator.

8. The system of claim 1 wherein the first IF frequency is approximately 4.4 MHz.

9. A method of transmitting a plurality of audio signals across a network within a spectrum allocated for a single audio channel comprising:
    modulating a first audio source signal on to a first IF frequency which is slightly less than a central frequency of the spectrum;
    modulating a second audio source signal on to a second IF frequency which is slightly greater than the central frequency; and,
    summing the first and second modulated audio source signals to generate an RF output audio signal which is transmitted across the network along with a plurality of video signals.

10. The method of claim 9 further comprising encrypting at least one of the audio source signals.

11. The method of claim 9 wherein at least one of the audio source signals is passed through a stereo generator.

12. A settop terminal for receiving dual audio services within the bandwidth allocated for a single audio channel comprising:
    a dual audio section having a mixer capable of generating a plurality of oscillator signals each having different frequencies and a switch for selecting among the oscillator signals, the switch being controlled by a microprocessor to select an oscillator signal in accordance with the desired audio service received by the terminal; and,
    a standard audio section for selecting between a signal received from the dual audio section and an audio service received from a single channel demodulator.

13. The settop terminal of claim 12 further comprising a deencryting section within the standard audio section, the deencrypting section being selectively activated when encrypted audio signals are received.

14. The settop terminal of claim 13 wherein the settop terminal is capable of receiving, demodulating and outputting on a given frequency, any of the following modes of input audio signals:
    a) a 4.5 MHz unencrypted audio channel;
    b) a 4.5 MHz encrypted audio channel;
    c) a 4.4 MHz unencrypted audio channel;
    d) a 4.4 MHz encrypted audio channel;
    e) a 4.66 MHz unencrypted audio channel; and,
    f) a 4.66 MHz encrypted audio channel.

* * * * *

UNITED STATES PATENT AND TRADEMARK OFFICE
CERTIFICATE OF CORRECTION

PATENT NO. : 6,587,825 B1
DATED : July 1, 2003
INVENTOR(S) : Gleitz et al.

It is certified that error appears in the above-identified patent and that said Letters Patent is hereby corrected as shown below:

<u>Column 7,</u>
Lines 41 and 44, after the word "device", insert the word -- and --.

Signed and Sealed this

Thirtieth Day of December, 2003

JAMES E. ROGAN
*Director of the United States Patent and Trademark Office*